United States Patent Office 3,014,850
Patented Dec. 26, 1961

3,014,850
RECOVERY OF HIGH PURITY COPPER FROM COPPER SCRAP
Frank K. Savage, Kalamazoo, Mich., and Henry Latta Pinkerton, Hatboro, and Arthur Kenneth Graham, Jenkintown, Pa., assignors to Graham, Savage & Associates, Inc., Kalamazoo, Mich., a corporation of Illinois
No Drawing. Filed Nov. 24, 1959, Ser. No. 855,008
7 Claims. (Cl. 204—10)

This invention relates to an economical and efficient process of recovering copper in a pure and more valuable form from copper scrap and constitutes a continuation-in-part of our co-pending application Serial Number 775,583, now abandoned.

The scraps particularly suitable for the process are those which have high copper content (95% and above), such as the class of scrap known in the art as No. 1 and No. 2 Light, also cement copper and the like. The non-copper portion of the scrap may be organic in nature, such as electrical insulation, and other metals present in the scrap as alloying ingredients or contaminants such as iron, zinc, lead or tin, the last two arising principally from the fact that some of the No. 2 Light wire scrap is tinned.

The instant process, which is eminently suited for continuous operation comprises essentially the steps of dissolving the scrap in a non-oxidizing acid, oxidizing the tin in the copper-enriched acid solution until an insoluble salt is produced, presumably metastannic acid, removing the salt and finally electrolyzing the solution either to produce copper powder or cathode copper of very high purity, it being understood that where necessary the scrap is burned to remove organic matter and subjected to a magnetic separating device for the removal of tramp iron.

The dissolution of the scrap is effected by alternately wetting the mass of scrap particles in a suitable dissolving tank with a non-oxidizing acid such as sulfuric acid, and exposing the mass to an oxidizing medium, preferably a forced slow stream of hot air.

The basic principle behind the process is that the sulfuric acid, preferably heated, is drained off the scrap as quickly and as thoroughly as possible and the acid-wet scrap is allowed to stand in contact with air for a certain period during which oxidation of a portion of the copper content of the scrap occurs. On the next wetting with acid, some of these oxides are dissolved away.

It is postulated that the thin film of acid which is inevitably left behind on each particle is quickly neutralized by the oxides remaining and thus loses its dissolving power before a fresh scrap surface is exposed. It is also believed that during the period when the wet scrap is exposed to the air, oxygen dissolves in the surface film of liquid and attacks the metal. Whatever the explanation, it is certain that an unexpectedly rapid and extensive oxidation occurs, which may be accelerated still further by the introduction of a slow stream of air, desirably of heated air. The oxidation reaction is exothermic and extensive. All the surfaces of the particles are blackened, and the temperature of the mass rises, especially with the introduction of added warm air, in some cases to 180° F. or even higher. If the volume of air used be too great, the temperature will rise to a lesser degree or even fall. It is thus possible to regulate the air volume to a desirable rate by observing the temperature during aeration. It is also desirable to provide means for shutting off the flow of air during the wetting period to promote the free and rapid drainage of the acid dissolving solution.

While the reaction will proceed using a non-oxidizing acid of any strength, it is most desirable to employ a solution containing free sulfuric acid, for example, in amounts between 50 and 250 gm./liter, preferably between 125 and 200 gm./liter. If the acid is too weak, it is neutralized before a desirably large proportion of the oxides are dissolved; if it is too strong, the solubility of the metal salts, especially of the copper salt, is diminished. At 150 gm./liter of free acid, other conditions being proper, from about 10 to about 80 gm./liter of metal may be dissolved in a single pass through the mass of scrap.

The acid dissolving solution should be moderately warm. If it is unheated, oxidation in the mass of wet scrap will be slow, as evidenced by little or no temperature rise and only a slow staining or darkening of the surface of the metal, instead of a rapid blackening. It is believed this is associated with the lower solubility rate of oxygen in strongly acid solutions, as well as to the fact that the mass of metal is cooler initially than it would be using acid at a higher temperature, which slows the oxidation reaction. It has been found desirable to operate with an acid temperature between 110 and 150° F., preferably between 125 and 135° F.

The duration of the aeration period may be varied widely. Obviously, some time is necessary for any oxidation to occur, but it has been observed that the temperature of the oxidizing mass usually reaches its maximum in two to four minutes, after which it declines, slowly at first and then more rapidly, indicating a reduction in the oxidation rate, which was to be expected, since this rate must become less as the surface of all particles becomes ever more heavily coated with oxide. Practically, oxidation appears to be completed in about twenty to thirty minutes, since the amount of metal dissolved per pass, which increases with increasing aeration time, becomes practically constant at all aeration times exceeding about twenty minutes. The optimum operating point, however, is not necessarily that at which the metal pick-up per pass is maximum, and in fact, it has been found that more metal can be dissolved per hour if the total cycle time is about five minutes, which corresponds to one to two minutes for wetting and draining and three to four minutes of aeration. Under these conditions, the metal pickup will be closer to 10 to 30 gm./liter per pass instead of the range of 10 to 80 gm./liter per pass cited above.

In actual practice, the volume of acid used and its rate of addition should not be such as to flood the particles. Filling of the dissolving tank or tower with acid should be avoided, but if this should occur, the supply of acid should be stopped to allow the acid to drain through the particles as quickly as possible. As soon as the acid has drained through, the air is turned on and then off, at which time acid is again admitted and the cycle is repeated while adding additional scrap at at rate equal to that at which it is being dissolved. The time for each cycle, that is from acid to acid, is at least two minutes.

The copper-enriched acid solution may contain as dissolved metallic impurities some of the aforementioned metals present in the scrap. The solubility of lead is limited, and up to saturation has no effect on the purity or other properties of the electrolytic copper which is to be produced from the solution. Zinc and iron are more soluble, but under the usual conditions of electrolysis to produce either cathode copper or copper powder, do not enter into the deposit to any measurable extent. Iron in large amounts will adversely affect the efficiency of copper deposition, but this is a matter of economics and can be handled as will be described. The matter of tin contamination of the copper-bearing solution is a more serious matter, as tin will co-deposit with copper to a certain extent, especially when the copper content of the solution is low, as is the case in the production of electrolytic copper powder. It therefore becomes necessary to purify the electrolyte with respect to tin, and we have discovered that this may be satisfactorily accomplished by oxidizing the tin to the stannic state, whereby it is gradually converted to an insoluble salt, presumably metastannic acid, which may be removed by settling or filtration. Elevated temperatures assist this oxidation and precipitation. It is therefore fortuitous that in the practice of the invention the temperature of the solution coming from the dissolver ready for the oxidation step is about 160° to 180° F. The oxidation of the tin to the insoluble stannic state in the highly acid environment of the copper-enriched solution coming from the dissolver may be effected in a number of ways. Desirably, hydrogen peroxide is added in an amount in slight excess of that required to oxidize the tin. If iron is also present in the solution, it will, of course, consume the oxidant. In practice, therefore, the amount of hydrogen peroxide used must be equal to and preferably in slight excess of the amount necessary to oxidize both the iron and the tin. Other oxidants, such as alkali peroxides or ammonium persulfate can be substituted for the hydrogen peroxide. In fact, any oxidant may be employed provided, of course, that neither it nor its reaction products will undesirably contaminate the electrolyte, as would be the case, for example, with nitrates or chromates. The tin in the highly acid, copper-enriched solution from the dissolver can also be oxidized electrolytically at an insoluble anode in a compartmented cell, the cathode and its electrolyte being separated from the anode and anolyte by a suitable porous diaphragm.

Finally, after oxidation of the tin and removal of the insoluble salts by settling or filtration, the solution is fed to a reservoir and then to electrolytic cells or to the cells directly there to be electrolyzed by conventional and well-known means to produce cathode copper or copper powder of very high purity. Electrolysis to produce cathode copper is a process old and well known in the art and comprises essentially the use of a solution containing in excess of 30 gm./liter of copper, varying amounts of free sulfuric acid, current densities of the order of 10–40 a.s.f. and room temperature although higher temperatures may also be used. Insoluble anodes and cathodes of copper starter sheets are commonly employed. The process of producing electrolytic copper powder is also well known in the art and comprises essentially the use of a solution containing less than 10 gm./liter of copper, usually high concentrations of free sulfuric acid, current densities in excess of 40 a.s.f. and elevated temperatures of the order of 130–150° F. Insoluble anodes are employed and the cathodes may be stainless steel, aluminum, lead or copper. We prefer copper cathodes. See F. Wills and E. J. Cugston, "Production of Electrolytic Copper Powder," J. Electrochem. Soc. 106, pp. 362–366 (1959).

As mentioned earlier, the instant process is rendered more efficient and economical because of the fortuitous fact that the copper-enriched solution coming from the dissolver has attained a temperature of 160 to 180° F. which favors the oxidation of the tin to the insoluble metastannic state. Furthermore, for the complete oxidation of tin and its precipitation as metastannic acid, it takes about an hour after addition of the oxidant, during which time the temperature of the solution drops only to about 130° F. which is favorable to the process of producing electrolytic copper powder.

In practice, after filtration to remove the insoluble tin salts, the solution is fed to a reservoir and from there into electrolytic cells to produce either cathodic copper or copper powder. The effluent from the cells either returns to the dissolver, or partly to the dissolver and remainder to the reservoir, or to the dissolver augmented by flow from the reservoir. Accordingly, the solution composition is readily controlled by adjusting the electrolytic deposition rate in relation to the rate at which copper is dissolved and by adjusting the relative flow rates to the dissolver and to the electrolytic cells.

After long periods of operation, iron or some other undesirable contaminant which is not removed by the oxidation step, may build up in the electrolyte to an intolerable concentration. At this joint, the electrolyte, if it contains sufficient copper to justify its recovery, may be stripped down (to a low enough copper content to justify discarding it) by continued electrolysis without using the dissolver to replenish the solution.

The following is illustrative of the efficacy of the process in producing electrolytic copper powder of very high purity. An electrolyte containing 8.5 gm./liter copper as sulfate, 60 gm./liter sulfuric acid and in addition 0.3 gm./liter each of zinc, tin, iron and lead was electrolyzed at 140° F. with a current density of 50–55 a.s.f. These impurities are greatly in excess of the amount of metal contaminants encountered in the most impure No. 2 Light copper scrap. The copper powder produced analyzed: Cu—98.66%, Sn—0.48%, Pb—0.01%, Zn—0.01%, Fe—0.02%, $HNO_3$ insol.—0.66%. The aforementioned electrolyte was heated to 160° F. and oxidized by the addition of hydrogen peroxide in an amount in slight excess of that required to oxidize the iron and tin, which in this case was 1 ml. per liter of a 30% by volume aqueous solution of hydrogen peroxide. After standing for about an hour, the precipitate was filtered off and the resulting solution electrolyzed under the aforementioned conditions, i.e., at 140° F. and 50–55 a.s.f. The copper powder produced analyzed: Cu—99.68%, Sn—not detected, Pb—not detected, Zn—not detected, Fe—0.01%, $HN_3$ insol.—trace.

It will be understood that skilled artisans may make minor variations without departing from the spirit of the invention and the scope of the appended claims.

We claim:

1. A process of recovering copper of high purity from scrap of high copper content containing tin as a contaminant comprising repeated cycles wherein the scrap is wetted with sulfuric acid followed by drainage and aeration of the acid-wet scrap, then completely oxidizing the tin in the copper-enriched acid solution with a peroxide to produce an insoluble stannic compound, separating the solution from the precipitate and electrolyzing the solution to recover copper.

2. A process of recovering copper of high purity from scrap of high copper content containing tin as a contaminant comprising repeated cycles wherein the scrap is wetted with sulfuric acid followed by drainage and aeration of the acid-wet scrap, then adding to the copper-enriched acid solution hydrogen peroxide in an amount and for a time sufficient to completely oxidize the tin to an insoluble stannic compound, removing the precipitate thus formed and elctrolyzing the resultant solution to recover copper.

3. The process of claim 2 wherein the concentration of the sulfuric acid is between 50 and 250 gm./liter, its temperature is maintained between 110 and 150° F., and the resultant solution is electrolyzed to produce copper powder.

4. The process of claim 3 wherein the time per pass for wetting the scrap with the acid and draining is 1 to 2 minutes and for aerating the wetted scrap is 3 to 4 minutes.

5. A process of recovering copper of high purity from scrap of high copper content containing tin as a contaminant comprising repeated cycles wherein the scrap is wetted with sulfuric acid followed by drainage and aeration of the acid-wet scrap, then adding to the copper-enriched acid solution hydrogen peroxide in an amount and for a time sufficient to completely oxidize the tin to an insoluble stannic compound, removing the precipitate thus formed and elctrolyzing the resultant solution to recover copper powder using insoluble anodes and copper cathodes.

6. A process of recovering copper of high purity from scrap of high copper content containing tin as a contaminant comprised of wetting the scrap with sulfuric acid followed by drainage and exposure of the acid-wet scrap to air, then converting the tin in the copper-enriched acid solution to an insoluble stannic compound with a peroxide, removing the precipitate thus formed and electrolyzing the resultant solution to recover copper.

7. A process of recovering copper of high purity from scrap of high copper content containing tin as a contaminant comprised of wetting the scrap with sulfuric acid followed by drainage and exposure of the acid-wet scrap to air, then converting the tin in the copper-enriched acid solution to an insoluble stannic compound with a peroxide, removing the precipitate thus formed and electrolyzing the resultant solution to recover copper powder using insoluble anodes and copper cathodes.

References Cited in the file of this patent

UNITED STATES PATENTS

| | | |
|---|---|---|
| 1,770,866 | Smith | July 15, 1930 |
| 1,890,856 | Lewin | Dec. 13, 1932 |

FOREIGN PATENTS

| | | |
|---|---|---|
| 227,125 | Great Britain | Aug. 13, 1925 |